United States Patent [19]

Shimada et al.

[11] Patent Number: 5,073,786

[45] Date of Patent: Dec. 17, 1991

[54] THERMAL HEAD BREAKAGE DETECTING CIRCUIT

[75] Inventors: Fumihiro Shimada; Hisashi Uemura, both of Hyogo, Japan

[73] Assignee: Kanzaki Paper Mfg. Co., Ltd., Tokyo, Japan

[21] Appl. No.: 595,519

[22] Filed: Oct. 11, 1990

[30] Foreign Application Priority Data

Oct. 31, 1989 [JP] Japan .................................. 1-285826

[51] Int. Cl.[5] ............................................. G01D 15/10

[52] U.S. Cl. ................................ 346/76 PH; 400/74

[58] Field of Search .................... 219/497; 400/54, 74; 346/76 PH; 324/522, 523, 549, 502

[56] References Cited

U.S. PATENT DOCUMENTS 4,774,526 9/1988 Ito ................................ 346/76 PH

FOREIGN PATENT DOCUMENTS 0092870 5/1985 Japan .................................... 400/54

0092875 5/1985 Japan ............................ 346/76 PH 0174987 7/1989 Japan .................................. 324/522

*Primary Examiner*—Benjamin R. Fuller

*Assistant Examiner*—Nancy Le

*Attorney, Agent, or Firm*—Sughrue, Mion, Zinn, Macpeak & Seas

[57] ABSTRACT

A detection circuit for determining whether heating members within a thermal head are broken is disclosed. The circuit comprises a voltage source connected in series with a resistor, wherein the voltage source and resistor are connected in parallel with a diode. The diode allows current to flow from a thermal head driving power supply to a thermal head. invention also includes a comparator for comparing the voltage The present level at the output terminal of the diode with a reference voltage. The parallel connection of the diode and the voltage source/resistor allows the output voltage of the diode to maintain an expected voltage level while the heating members are operating normally (i.e. the members are not broken). The parallel connection also allows the voltage level at the output terminal of the diode to increase as the members operate abnormally (i.e. a worn or broken condition). The comparator monitors this voltage level, and detects undesirable fluctuations therein. Thus the circuit of the present invention prevents printing of incorrect letters.

3 Claims, 1 Drawing Sheet

THERMAL HEAD BREAKAGE DETECTING CIRCUIT

BACKGROUND OF THE INVENTION

The present invention relates to a circuit for detecting breakage of a large number of heating members arranged to construct a thermal head.

When a heating member on a printer thermal head breaks, the heating member does not generate the correct amount of heat for printing, and a missing letter or line results therefrom. Previously, broken heating members were detected by observing the printed surface of a test sheet. However, this visual testing method could not detect every broken heating member, since some broken heating members were located at white portions of the document. Therefore, unless incorrect letters were printed, the abnormality of the heating member could not be detected, and satisfactorily prevented.

In addition, some testing methods uses a test pattern in which the sheet was partially colored throughout, thereby requiring partial heating of every member. This, test pattern arrangement often caused the power supply to be overloaded and damaged. Therefore, it was necessary to arrange the test pattern such that the power supply of the thermal head was not overloaded. Finally, the only proposed circuit for electrically detecting broken heating members is complicated and expensive, thereby making it unpractical.

SUMMARY OF THE INVENTION

An object of the present invention is to provide a simple circuit for detecting broken heating members within thermal heads.

To accomplish the above object, the thermal head breakage detecting circuit of the present invention comprises a voltage source and a resistor connected in series to the voltage source. The voltage source and resistor are connected in parallel with a diode, and the diode is positioned between a thermal head driving power supply and the thermal head. The present invention also includes a comparator for comparing the voltage drop across the diode with a reference voltage.

According to the present invention, printing defective letters can be prevented by providing a voltage source, a resistor, a diode, and a comparator in the above arrangement, between the thermal head and the driving power supply.

DETAILED DESCRIPTION OF THE PREFERRED EMBODIMENT

The present invention will now be described in more detail with reference to the accompanying drawings.

Figure 1:
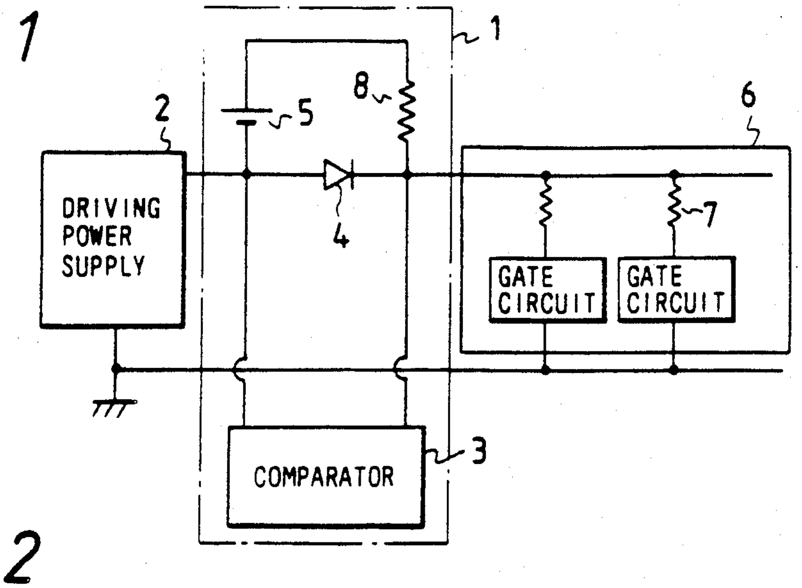
FIG. 1 is a circuit diagram describing the structure of the present invention.

Referring to FIG. 1, the detecting circuit 1 consists of the series circuit of the voltage source 5 and resistor 8 connected between the driving power supply 2 and the thermal head 6. The diode 4 is connected in parallel with source 5 and resistor 8 and is oriented such that the diode allows current flow from the driving power supply 2 to the thermal head 6. The comparator 3 is joined in parallel with the diode 4 for comparing the voltage drop across the diode 4.

The current applied to the heating member 7 is generated by the driving power supply 2 in response to the printing signal (not shown), wherein this current flows to the heating member 7 during normal operating conditions through the diode 4. Current similarly flows to the heating member 7 through the voltage source 5 and resistor 8. Although a slight power drop occurs across the diode 4, during normal operation, this voltage drop is minimized by resistor 8 and source 5 (approx. 0.7v).

However, when the heating member is in an abnormal operating condition (i.e. broken), current does not flow through resistor 8, which causes a zero voltage drop across resistor 8. Accordingly, the potential across voltage source 5 becomes the potential across diode 4. Therefore, the condition (i.e. broken or not broken) of the heating member 7 can be detected by the comparator 3 by detecting whether the voltage across the diode 4 is near zero (approx 0.7v) or nearer the voltage potential of voltage source 5.

In addition, the voltage drop across the diode 4 is continually representative of the heat member 7 condition; namely the resistance of the heat member 7. Also, as the heat member begins to break (but before completely breaking) the resistance and voltage drop across the member increases, which causes the voltage drop across resistor 8 to decrease. Thus the potential across diode 4 increases, which is detected by the comparator 3. As a result, the printing of defective letters can be prevented.

In the above embodiment, the comparator measures the voltage across diode 4. However, as shown in the alternative embodiment of FIG. 2, this comparator measurement could be replaced by comparing the voltage level at the diode output terminal 22 (FIG. 2) with a reference voltage, at node 26.

Figure 2:
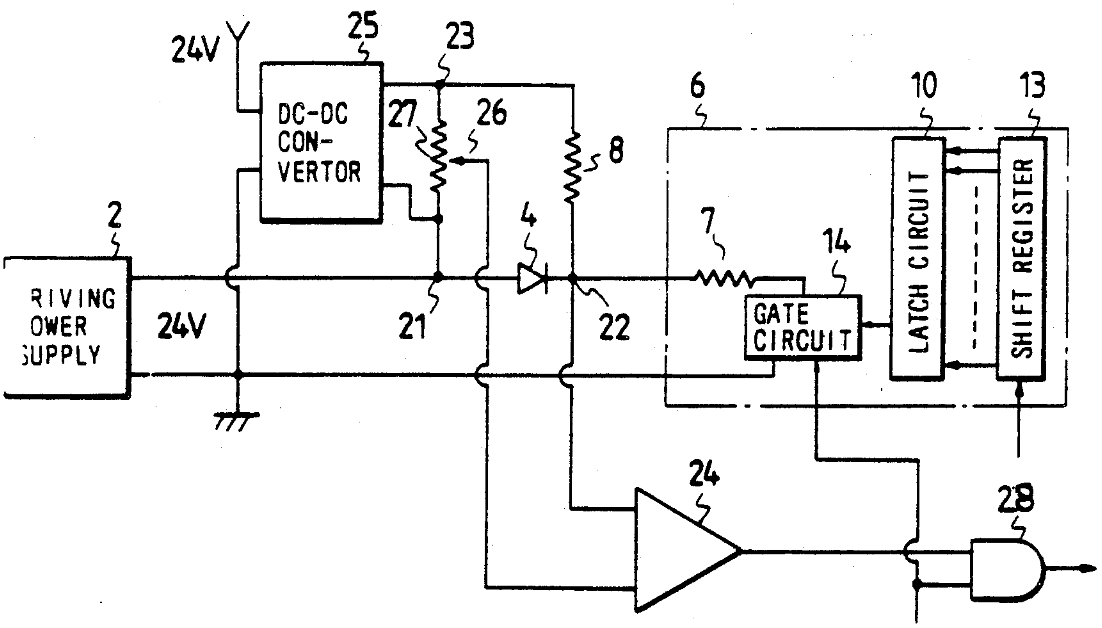
FIG. 2 a circuit diagram showing a second detailed layout of the present invention.
Figure 3:
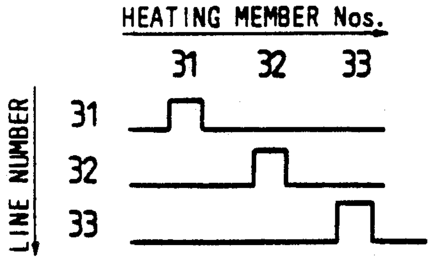
FIG. 3 a chart of a test pattern signal of the preferred embodiment.

Referring to the embodiment of FIG. 2, a DC-DC converter 25 is used as a voltage source. The DC-DC converter 25 accepts 24 VDC input, from the driving power supply 2, and outputs a 5 VDC signal. Each heating member 7 is connected to a ground terminal through a gate circuit 14. Each gate circuit 14 is turned on when a print pattern signal is received, via a latch circuit 10, from a print command signal, and in response thereto the heating member 7 is energized. Data of one dot line is read to a shift register 13, which outputs the resultant parallel data to the latch circuit 10.

In the aforementioned embodiments, during testing a print pattern signal is sent to each heating member 7, to determine the condition of each heating member (broken or not broken). This print pattern includes lines/-rows of dots, wherein each dot represents a heating member. One dot on each line of the print pattern is colored (i.e. not white), while the colored dot on each line is sequentially moved across the pattern. This pattern allows every heating member to be tested. The resistance of the heating member 7 ranges between 500 ohms and 1 k ohms. The resistance of a resistor 8 is 1 k ohms. The voltage at node 23, shown in FIG. 2, is 24 V+5 V=29 V. When the heating member 7 is normal and energized by the print command signal, the voltage at node 22 equals 23.3 V which is 0.7 V (the voltage drop of the diode D) lower than the output voltage of the driving power supply 2 (24V). Current flows from the driving power supply 2 (approx. 25 mA) and the voltage source 5 (approx. 5 mA), through the resistor 8, and into the heating member 7. In total, a current of approximately 30 mA flows into the heating member 7. When a current of approximately 5 mA flows into the heating member 7, a voltage drop of approximately 5 V takes place in the resistor 7 and the voltage at node 22 becomes approximately 23.3 V. As the heating member becomes worn, its resistance increases proportionally and thereafter the heating member breaks. Before the heating member 7 breaks and as its resistance increases, the current flow into the heating member decreases. Thus the voltage at node 22 exceeds 23.3 V. After the heating member breaks, the voltage at node 22 equals 29 V.

Throughout operation, the voltage at node 22 is applied to the + (pos.) terminal of the comparator 24, and the voltage from node 26 is applied to the − (neg.) terminal of the comparator 24. The voltage from node 26 functions as a reference voltage, and is varied by resistor 27 between the voltage at node 21 (24v) and the voltage at node 23 (29v). By setting the voltage at node 26 to a desired voltage, ranging from 24 V to 29 V, a very thin and high resistance portion of the heating member 7 is detected before it breaks. The detection level can be set by adjusting the resistor 27. From this explanation, it is clear that before the heating member 7 breaks and defective letters are printed, it is possible to replace the thermal head and prevent printing of defective letters in an inexpensive and reliable manner.

The comparator 24 issues the signal, representing a defective thermal head 6, while the voltage at the + terminal is higher than that a the − terminal. The broken heating member 7 is detected by passing the output signal of the comparator 24 to an AND circuit 28 and thereafter sampling the AND circuit in accordance with the print command signal.

Although the invention has been described with respect to a preferred embodiment, it is not to be so limited as changes and modifications can be made which are within the full intended scope of the invention as defined by the appended claims.

What is claimed is:

1. A detection apparatus for determining whether heating members within a thermal head of a printer are broken, comprising:

a thermal head;

a driving power supply for delivering power to the thermal head during a printing operation;

a voltage source;

a resistor connected in series to said voltage source;

a diode connected between said driving power supply and said thermal head, said diode being oriented to allow current flow from said driving power supply to said thermal head, wherein said diode is connected in parallel with said resistor and said voltage source, said voltage source generating an expected voltage drop across said diode when any one of said heating members is broken; and comparator means for comparing a voltage level at an output terminal of said diode with a reference voltage, wherein said comparator means outputs a signal corresponding to whether any of said heating members are broken .

2. The detection apparatus of claim 1, further comprising means for separately testing each of said heating members by inputting a print pattern signal.

3. The detection apparatus of claim 1, further comprising:

a variable resistor connected to said power source, for generating said reference voltage.

* * * * *